June 6, 1950            J. G. ZUBER            2,510,360

LENS TURRET FOR PHOTOGRAPHIC CAMERAS

Filed Jan. 7, 1949

INVENTOR.
JOHN G. ZUBER
BY
*Robert F. Miehle*
ATTY.

Patented June 6, 1950

2,510,360

UNITED STATES PATENT OFFICE 2,510,360

LENS TURRET FOR PHOTOGRAPHIC CAMERAS

John G. Zuber, Chicago, Ill., assignor to Bell & Howell Company, Chicago, Ill., a corporation of Illinois Application January 7, 1949, Serial No. 69,792

5 Claims. (Cl. 88—57)

My invention relates to a lens turret construction of a photographic camera which provides for two lenses being selectively brought into photographing position, and is particularly adapted for relatively thin cameras as is the disclosure of U. S. Patent No. 1,859,207, granted May 17, 1932, on application of Albert S. Howell for improvement in Photographic camera on which my invention may be considered an improvement.

Objects of the invention reside in the provision of a lens turret construction which is compact and effective, which is particularly adapted for a relatively thin camera, which permits of a neat and pleasing appearance, which provides for the convenient interchange of lenses at the focal axis of the camera, which provides for the accurate registry of the selected lens with the focal axis of the camera, which is conveniently operated, which provides an effective light seal between the turret and the camera, and which provides against contact between the turret and camera as the turret is operated to interchange lenses so that marring or scratching of the parts is prevented.

The invention will be better understood by reference to the accompanying drawing forming a part hereof and in which.

Figure 1:
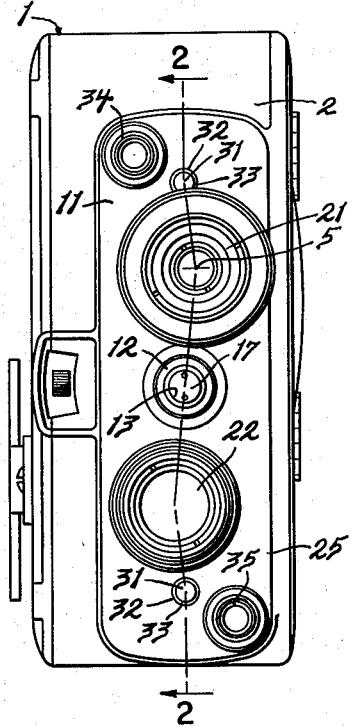
Figure 1 is a front elevation of a motion picture camera equipped with a lens turret construction embodying my invention.

Referring to the drawing, I designates generally a relatively thin motion picture camera provided with a front wall 2 having two vertically spaced apertures 3 and 4 communicating with the interior of the camera. See Figures 1 and 2. The upper aperture 3 alines with the focal axis 5 of the camera, and a forwardly facing cup 6 is secured in this aperture and is provided with a central aperture 7 which also is alined with the focal axis 5 and rearwardly through which light passes for exposing a film in the camera. A second forwardly facing cup 8 is secured in the aperture 4 and prevents light from passing therethrough, the recesses of the cups 6 and 8 providing rearward clearance for photographic lenses.

A stud 9 is secured on and projects forwardly from the front wall 2 and is disposed between the apertures 3 and 4 in equally spaced relation therewith and consequently is vertically spaced from the focal axis 5 of the camera. See Figure 2.

An elongated lens carrier 11, in the form of a flat plate, has a bored hub 12 secured centrally thereon and projecting forwardly thereof. The bore 13 of the hub has a rear enlargement 14 to accommodate a rear enlargement 15 on the stud 9, and has a short reduced portion 16, immediately in front of the rear enlargement 14, which is engaged for rotation and axial sliding movement on the stud 9. A headed screw 17 is screwthreaded into the forward end of the stud 9 and the forward end portion of the bore 13 is engaged on the head of this screw for rotation and axial sliding movement. Thus, a bearing is provided which carries the lens carrier 11 centrally thereof on the camera for angular movement on a bearing axis central of the carrier and spaced from the focal axis of the camera and for movement along this axis toward and away from the camera. A helical compression spring 18 is arranged on the stud 9 between the head of the screw 17 and the reduced bore portion 16 of the hub 12 and engages this screw head and bore portion to yieldably urge the lens carrier rearwardly toward the camera and to normally maintain it in a rearward position.

The lens carrier 11 is provided with two lens mounts 19, in the form of screwthreaded apertures, which are spaced longitudinally of the carrier in diametrically opposite equally spaced relation with the axis of the carrier bearing for selective registration of the lens mounts with the focal axis 5 respectively in diametrically opposite angular positions of said carrier in which, it will be observed, the lens carrier is disposed vertically and within the margin of the front of the camera. See Figure 1. Thus, photographic lenses 21 and 22 of different focal characteristics and respectively mounted in the lens mounts 19, may be conveniently selectively registered with the focal axis of the camera.

The lens carrier 11 is provided with an elongated shouldered seat 23 facing rearwardly toward the camera and extending about the margin of the carrier in symmetrical relation with the axis of the carrier bearing, and the front wall 2 of the camera is provided with a shouldered seat 24 facing forwardly toward the lens carrier and mating with the carrier seat and engageable and disengageable therewith respectively with movement of the lens carrier rearwardly toward and forwardly away from the camera when the carrier is in either of the said diametrically opposite positions. When the shouldered seats 23 and 24 are engaged, they provide an effective light seal between the lens carrier and front wall of the camera to prevent any stray light passing therebetween. The lens carrier is preferably provided with a marginal flange 25 extending outwardly from the shouldered seat 23 and overlying the front surface of the front wall of the camera when the shouldered seats 23 and 24 are engaged, so that the shouldered seats are concealed and the appearance of the camera is enhanced.

The spring 18 normally urges the lens carrier 11 rearwardly toward the camera and so maintains the shouldered seats 23 and 24 in engagement, and to interchange the lenses on the carrier with reference to the focal axis of the camera, the lens carrier is moved forwardly away from the camera against the influence of the spring 18, by grasping the hub 12, to disengage the shouldered seats 23 and 24, after which the carrier is moved angularly to bring the desired lens mount into registry with the focal axis of the camera, the shouldered seats 23 and 24 being then engaged by permitting the spring 18 to move the carrier rearwardly toward the camera. The reduced bore portion 16 of the bore 13 of the hub 12 is loosely fitted on the stud 9, as is apparent in Figure 2, so that the lens carrier may pivot slightly transversely of the axis of the carrier bearing, the spring 18 and the spaced relation of rear bore portion 14 and the rear stud enlargement 15 permitting such movement. Consequently, the shouldered seats 23 and 24, which extend considerably radially of the lens carrier bearing axis, closely engage throughout their extents without interference from the lens carrier bearing, with the result that the lenses are firmly and accurately positioned on the camera when either of them is in photographing position.

Figure 2:
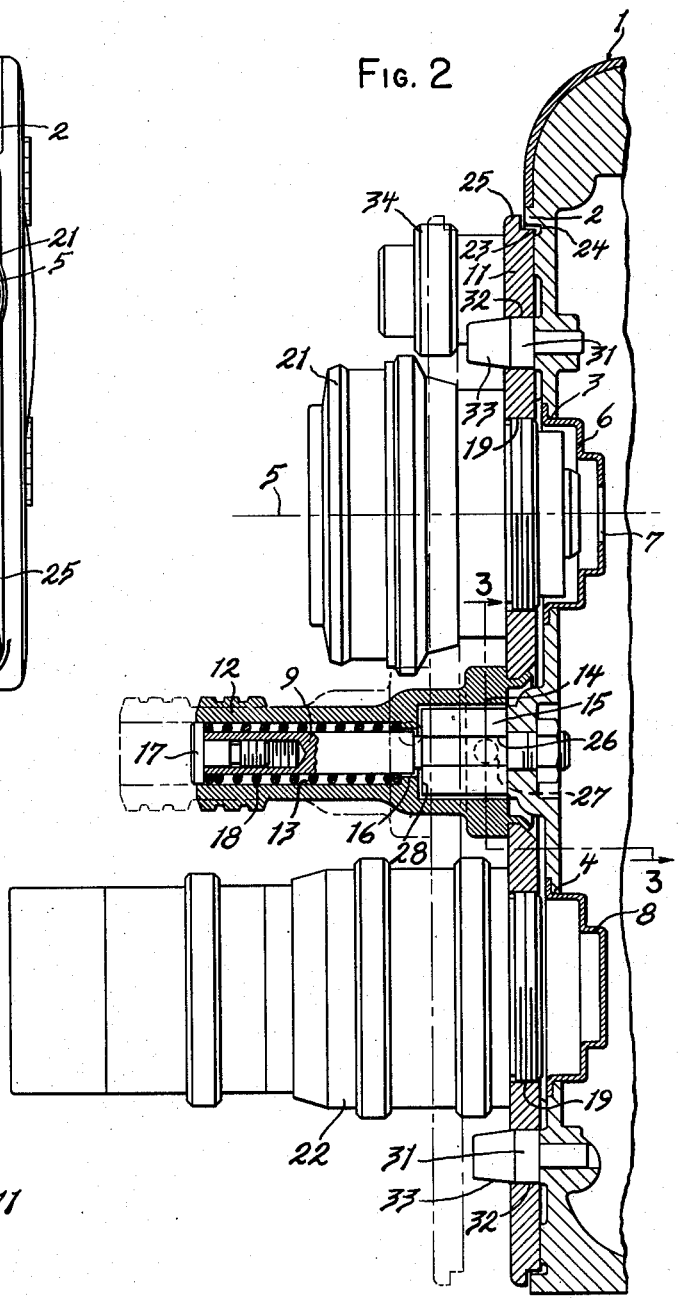
Figure 2 is a partial sectional view substantially on the line 2—2 of Figure 1.
Figure 3:
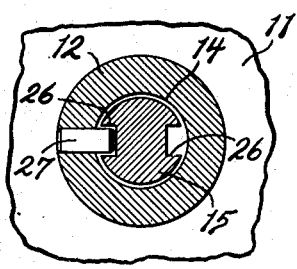
Figure 3 is a partial sectional view substantially on the line 3—3 of Figure 2.

The rear stud enlargement 15 of the stud 9, see Figures 2 and 3, is provided with two diametrically opposite longitudinally extending slots 26, and a stud 27 is secured on the rear portion of the hub 12 and extends radially inward from the enlarged rear bore portion 13. The stud 27 forms a shoulder element which is engageable axially of the lens carrier bearing axis and rearwardly against a shoulder 28, formed by the front end of the rear stud enlargement 15, when the lens carrier is positioned forwardly of the camera and is positioned angularly out of its lens mount focal axis registering positions as shown in dot and dash lines in Figure 2, to prevent rearward movement of the lens carrier toward the camera, so that the lens carrier may be rotated between its lens mount focal axis registering positions without requiring it to be held forwardly of the camera against the influence of the spring 18. The slots 26 of the rear stud enlargement 15 form interruptions in the shoulder 28 into either of which the stud 27 may engage and so permit rearward movement of the lens carrier toward the camera, and the arrangement is such that the stud 27 is engageable in a slot 26 when the lens carrier is in either of its lens mount focal axis registering positions so that the lens carrier may move rearwardly toward the camera to engage the seats 23 and 24 as shown in Figures 2 and 3.

A pair of vertically spaced register pins 31 are mounted on and project forwardly from the front wall 2 of the camera, and are radially remote from the lens carrier bearing axis and preferably are radially spaced from the lens carrier bearing axis a distance greater than the radial spacing of the lens mounts 19 of the lens carrier from the lens carrier bearing axis, and are disposed in diametrically opposite equally spaced relation with the lens carrier bearing axis. The lens carrier is provided with a pair of register apertures 32 therethrough which are spaced longitudinally thereof and disposed in the same relation with the lens carrier bearing axis as are the register pins.

The arrangement is such that the apertures 32 register with the pins 31 when the lens carrier is in either of its lens mount focal axis registering positions, and the apertures are engageable and disengageable with the pins respectively with movement of the lens carrier toward and away from the camera at a position thereof between the position established by the engagement of the shoulder stud 27 with the shoulder 28 and that at which the seats 23 and 24 engage and disengage, the pins 31 being tapered forwardly, as designated at 33, to facilitate engagement of the registering aperture and pins. By reason of the register apertures and pins being spaced a relatively great distance from the lens carrier bearing axis, the lens carrier is registered at the lens mount focal axis positions thereof with correspondingly great accuracy as distinguished from such registry as might be effected by the positioning means, comprising the shoulder stud 27 and the stud enlargement 15 with its slots 26 and shoulder 28, which is disposed in the region of the lens carrier bearing axis and within the confines of the width of the lens carrier in order to prevent rearward movement of the lens carrier toward the camera except at the lens mount focal axis registering positions thereof.

In interchanging the lenses on the lens carrier with reference to the focal axis of the camera, the lens carrier is moved forwardly away from the camera against the influence of the spring 18, by grasping the hub 12, to first disengage the shouldered seats 23 and 24, then to disengage the register apertures and pins 32 and 31, and finally to disengage the shoulder stud 27 from a slot 26. The lens carrier is then rotated to bring the desired lens into registry with the focal axis of the camera, the shoulder stud 27 and shoulder 28 preventing movement of the lens carrier rearwardly toward the camera during the major portion of the angular movement of the carrier. As the desired lens approaches registry with the focal axis of the camera, the stud 27 engages in a slot 26 and the lens carrier is permitted to move rearwardly toward the camera under the influence of the spring 18, and during this movement the register apertures engage on the register pins and register the lens carrier in lens mount focal axis registering position previous to the engagement of the lens seats 23 and 24, and the lens seats are engaged in registered relation with final movement of the lens carrier rearwardly toward the camera, it being observed that the lens carrier cannot contact the front wall 2 of the camera unless it is in lens mount focal axis registering position.

Preferably viewfinder lenses 34 and 35 respectively corresponding with the focal characteristics of the photographic lenses 21 and 22 are detachably mounted on the lens carrier, and these viewfinder lenses are disposed to selectively register with a viewfinder tube, not shown, on the camera when the corresponding photographic lens is registered with the focal axis of the camera.

While I have thus described my invention, I do not wish to be limited to the precise details described, as changes may be readily made without departing from the spirit of my invention, but having thus described my invention, I claim as new and desire to secure by Letters Patent the following:

1. The combination with a photographic camera, of an elongated lens carrier, a bearing carrying said carrier centrally thereof on said camera for angular movement on a bearing axis central of said carrier and spaced from the focal axis of said camera and for movement along said axis toward and away from said camera, said carrier being provided with two lens mounts spaced longitudinally thereof in diametrically opposite equally spaced relation with said bearing axis for selective registration of said lens mounts with said focal axis respectively in diametrically opposite angular positions of said carrier, a spring operative on said carrier centrally thereof and yieldably urging the same toward said camera, said carrier being provided with an elongated shouldered seat facing toward said camera and extending about the margin of said carrier in symmetrical relation with said bearing axis, and said camera being provided with a shouldered seat facing toward said carrier and mating with said carrier seat and engageable and disengageable therewith respectively with movement of said carrier toward and away from said camera when said carrier is in either of said diametrically opposite positions.

2. The combination of claim 1 and further including cooperating shoulder elements in the region of said bearing axis and carried respectively with said carrier and camera and opposingly engageable axially of said bearing axis to position said carrier away from said camera with said seats disengaged and interrupted angularly of said bearing axis to permit movement of said carrier toward said camera when said carrier is in either of said diametrically opposite positions.

3. The combination with a photographic camera, of an elongated lens carrier, a bearing carrying said carrier centrally thereof on said camera for angular movement on a bearing axis central of said carrier and spaced from the focal axis of said camera and for movement along said axis toward and away from said camera, said carrier being provided with two lens mounts spaced longitudinally thereof in diametrically oposite equally spaced relation with said bearing axis for selective registration of said lens mounts with said focal axis respectively in diametrically opposite angular positions of said carrier, a spring operative on said carrier centrally thereof and yieldably urging the same toward said camera, cooperating shoulder elements in the region of said bearing axis and carried respectively with said carrier and camera and opposingly engageable axially of said bearing axis to position said carrier forwardly and interrupted angularly of said bearing axis to permit movement of said carrier toward said camera when it is in either of said diametrically opposite positions, and cooperating register elements carried respectively with said carrier and camera radially remote from said bearing axis for registering said carrier on said camera in said diametrically opposite angular positions and engageable and disengageable respectively with movement of said carrier toward and away from said camera at a position of said carrier between the position thereof established by said shoulder elements and the extreme position of said carrier toward said camera.

4. The combination of claim 1 and further including cooperating shoulder elements in the region of said bearing axis and carried respectively with said carrier and camera and opposingly engageable axially of said bearing axis to position said carrier away from said camera with said seats disengaged and interrupted angularly of said bearing axis to permit movement of said carrier toward said camera when said carrier is in either of said diametrically opposite angular positions, and cooperating register elements carried respectively with said carrier and camera radially remote from said bearing axis for registering said carrier and camera in said diametrically opposite angular positions and engageable and disengageable respectively with movement of said carrier toward and away from said camera at a position of said carrier between the position thereof established by said shoulder elements and that at which said seats engage and disengage.

5. The combination of claim 1 and further including cooperating shoulder elements in the region of said bearing axis and carried respectively with said carrier and camera and opposingly engageable axially of said bearing axis to position said carrier away from said camera with said seats disengaged and interrupted angularly of said bearing axis to permit movement of said carrier toward said camera when said carrier is in either of said diametrically opposite angular positions, and cooperating register elements carried respectively with said carrier and camera and radially spaced from said bearing axis a distance greater than the radial spacing of said lens mounts from said bearing axis for registering said carrier and camera in said diametrically opposite angular positions and engageable and disengageable respectively with movement of said carrier toward and away from said camera at a position of said carrier between the position thereof established by said shoulder elements and that at which said seats engage and disengage, said register elements comprising respectively a pair of register pins disposed in diametrically opposite equally spaced relation with said bearing axis and a pair of register apertures disposed in the same relation with said bearing axis as are said registering pins.

JOHN G. ZUBER.

REFERENCES CITED

The following references are of record in the file of this patent:

UNITED STATES PATENTS

| Number | Name | Date |
| --- | --- | --- |
| 1,818,062 | Howell | Aug. 11, 1931 |
| 1,859,207 | Howell | May 17, 1932 |
| 1,906,059 | Hadaway | Apr. 25, 1933 |
| 2,236,069 | Robinton | Mar. 25, 1941 |